(12) United States Patent
Roffers et al.

(10) Patent No.: US 10,605,687 B2
(45) Date of Patent: Mar. 31, 2020

(54) SPARK GAP DEVICE AND METHOD OF MEASUREMENT OF X-RAY TUBE VACUUM PRESSURE

(71) Applicant: General Electric Company, Schenectady, NY (US)

(72) Inventors: Richard Michael Roffers, Milwaukee, WI (US); Sergio Lemaitre, Milwaukee, WI (US); Christian Bennett Fuller, Milwaukee, WI (US); Kalyan Koppisetty, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 15/056,505

(22) Filed: Feb. 29, 2016

(65) Prior Publication Data

US 2017/0248485 A1    Aug. 31, 2017

(51) Int. Cl.
| | |
|---|---|
| *G01L 21/30* | (2006.01) |
| *H01J 21/02* | (2006.01) |
| *H01J 19/78* | (2006.01) |
| *H01J 23/12* | (2006.01) |
| *H01J 41/02* | (2006.01) |
| *H01J 35/20* | (2006.01) |

(52) U.S. Cl.
CPC ............ *G01L 21/30* (2013.01); *H01J 19/78* (2013.01); *H01J 21/02* (2013.01); *H01J 23/12* (2013.01); *H01J 35/20* (2013.01); *H01J 41/02* (2013.01); *H01J 2235/20* (2013.01); *H01J 2237/18* (2013.01)

(58) Field of Classification Search
CPC . H01J 35/16; H01J 19/78; H01J 21/02; G01L 21/00
See application file for complete search history.

(56) References Cited

U.S. PATENT DOCUMENTS

| | | | | |
|---|---|---|---|---|
| 3,387,175 A | * | 6/1968 | Lloyd | H01J 41/04 315/108 |
| 4,553,139 A | * | 11/1985 | Tanigaki | H02H 7/222 340/605 |
| 5,300,890 A | * | 4/1994 | Haas | H01J 41/04 250/389 |
| 7,352,187 B2 | * | 4/2008 | Knapp | G01L 21/12 324/460 |

(Continued)

*Primary Examiner* — Jeff W Natalini
*Assistant Examiner* — Dustin R Dickinson
(74) *Attorney, Agent, or Firm* — Boyle Fredrickson, S.C.

(57) ABSTRACT

In the present invention, a pressure measurement device for determining the vacuum level within the evacuated housing of a vacuum electrode device is provided that includes an electrically conductive enclosure secured to an interior surface of the housing, an electrically conductive electrode extending through an aperture in the housing, the electrode having a tip at one end positioned within the interior of the housing inside the enclosure to define a gap between the tip and the enclosure and a conductive lead at a second end disposed outside of the housing, and a voltage source connected to the conductive lead to supply a voltage potential to the tip of the electrode. A voltage difference produced between the electrode and the enclosure ionizes gas within the enclosure causing a measurable current to flow between the electrode and the enclosure which can be used to determine the vacuum level in the housing.

21 Claims, 5 Drawing Sheets

(56) References Cited

U.S. PATENT DOCUMENTS

| | | | | |
|---|---|---|---|---|
| 2004/0261502 A1* | 12/2004 | Watarai | .................... | F02B 77/08 73/35.13 |
| 2005/0140375 A1* | 6/2005 | Liu | ......................... | G01L 21/34 324/460 |
| 2006/0034425 A1* | 2/2006 | Unger | ...................... | H01J 35/10 378/125 |
| 2011/0234233 A1* | 9/2011 | Brucker | .................. | G01L 21/34 324/460 |
| 2012/0082299 A1* | 4/2012 | Tang | ....................... | H01J 35/06 378/123 |
| 2015/0091580 A1* | 4/2015 | Brucker | .................. | G01L 19/06 324/463 |
| 2016/0131548 A1* | 5/2016 | Brucker | .................. | G01L 21/34 324/460 |

* cited by examiner (Prior Art)
FIG. 1

SPARK GAP DEVICE AND METHOD OF MEASUREMENT OF X-RAY TUBE VACUUM PRESSURE

BACKGROUND OF INVENTION

The subject matter disclosed herein relates to vacuum electrode devices in general, including but not limited to x-ray tubes, electron beam source devices, power electronic devices, such as a klystron, ignitron, and others, and more specifically to devices and procedures for determining the pressure present within the vacuum electrode device.

Figure 1:
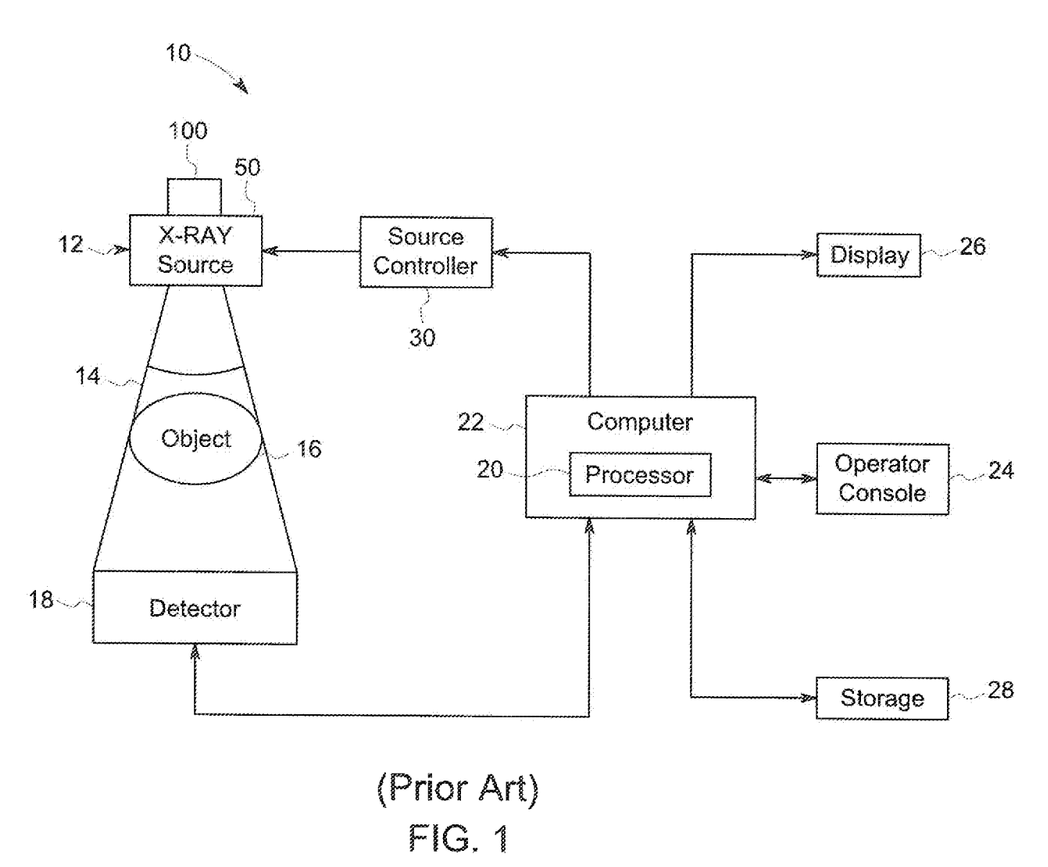
FIG. 1 is a block diagram of a prior art imaging system including an x-ray source.

Vacuum electron devices are used in a variety of systems in order to generate electrons for different purposes. In one example, as shown in FIG. 1 a vacuum electron device is used in an X-ray system 10 in the detection of internal structures of components of an object or item 16 being imaged.

The X-ray system 10 includes an x-ray source 12 configured to project a beam of X-rays 14 through an object 16. Object 16 may include a human subject, pieces of baggage, or other objects desired to be scanned. X-ray source 12 may be a conventional X-ray tube producing X-rays having a spectrum of energies that range, typically, from 30 keV to 200 keV. The X-rays 14 pass through object 16 and, after being attenuated by the object, impinge upon a detector 18. Each detector in detector 18 produces an analog electrical signal that represents the intensity of an impinging X-ray beam, and hence the attenuated beam, as it passes through the object 16.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, flash memory, compact discs, etc. The operator may also use console 24 to provide commands and instructions to computer 22 for controlling a source controller 30 that provides power and timing signals to x-ray source 12.

In the X-ray source 12, the cathode and anode are disposed within a frame/housing for the X-ray source/tube that is evacuated around the cathode/emitter and the anode in order to remove any gases that would otherwise interfere with the flow of electrons between the cathode and the anode. The housing is desired to enclose a perfect vacuum. However, as a result of imperfections in the materials and processes involved in manufacturing of the housing and the X-ray source 12, an amount of a gas, such as $N_2$, $H_2$, Ar, can be present within the housing. In addition, over time, other imperfections or irregularities in the construction of the housing or internal component outgassing can increase the gases in the housing, further compromising the operation of the vacuum electrode device. The reason for this is that when gas molecules are present in the housing, the electrons produced at the cathode can strike the gas molecules, ionizing the gas molecules and preventing the electron from reaching the anode to produce X-rays. Further, the ionized gas molecules can be drawn towards and strike the emitter/cathode, causing damage to the cathode which results in premature failure of the emitter/cathode and X-ray source 12. As a result, the presence of significant amounts of gas molecules within the housing presents serious negative effects on the longevity and the performance of the X-ray source 12. Thus, it is highly desirable to be able to determine the presence and amount of any gas within the housing in order to maximize the operation of the X-ray source 12.

The presence of a gas within the housing can be determined by measuring the gas pressure within the housing. With prior art vacuum electron devices/X-ray sources 12, in order to test the vacuum electron device for the amount of gas present in the housing, these prior art devices utilize one of two methods: the devices include a stand-alone pressure gauge 100 built into the housing for the X-ray source 12; or the pressure is determined using the emitter/cathode of the vacuum device directly. In either method, the pressure of the gas within the housing is determined by heating a cathode, either in the pressure gauge 100 or the cathode, and creating ionized gas particles that are drawn to a corresponding anode (not shown). The current produced by the ionized gas between the cathode and the anode can then be utilized to determine the gas pressure within the housing.

Issues with these prior art methods and devices include the increased complexity and cost associated with the stand-alone pressure gauge 100 to be attached to the housing and the fact that the vacuum device cathode could potentially be damaged by using it for pressure measurement if the pressure within the housing is high. In the ease of vacuum electrode devices that have been returned for analysis due to poor performance or for testing of the vacuum electron device during manufacture, damaging the cathode is undesirable as it prevents the cathode and other components of the vacuum electrode device from being able to be reused in other devices.

Hence it is desirable to provide a vacuum electrode device such as an X-ray source/tube with a pressure measurement device, system or feature that does not greatly increase the complexity of the device, and that does not need the cathode of the vacuum device in order to determine the pressure within the housing.

BRIEF DESCRIPTION OF THE INVENTION

There is a need or desire for a pressure measurement system or device and associated method to measure the pressure within a vacuum electrode device such as an X-ray tube that does not require a separate pressure gauge included in the device structure or the use of the cathode within the tube for the measurement. The above-mentioned drawbacks and needs are addressed by the embodiments described herein in the following description. In an exemplary embodiment of the invention, a pressure measurement device is provided for a vacuum electrode device in the form of a spark gap device disposed on the housing for the vacuum electrode device. The spark gap device includes an electrode/electron source or pin having one end disposed outside of the housing and a second end positioned within the housing. The electron source extends through an electrically isolating feedthrough into the housing, and is connected on the outside of the housing to a voltage source used to negatively bias the electrode/electron source.

Within the housing, an electrode enclosure is disposed around the electron source. The enclosure is biased oppositely to the electrode source, by either applying voltage to both the housing and the electrode or more conveniently just negatively biasing the electrode and leaving the housing grounded, to create a voltage difference between the electrode and the enclosure. When the voltage difference between the enclosure and the electrode or portion thereof exceeds the breakdown voltage of the gas particles present within the gap between the electrode and the enclosure, a spark forms which ionizes the gas particles and produces electrons. The electrons move towards the enclosure and the positively charged gas ions/ionized particles move towards the electrode. This movement of the electrons and the ionized particles will enable an electric current to flow across the gap between the enclosure and electrode. This current passes through the electrode/electron source outside of the housing and can be measured in conjunction with the voltage applied to the electron source to gauge the approximate vacuum level/gas pressure within the housing, such as to detect tube leaks during manufacture. Based on the measured vacuum level or gas pressure, a subsequent test can be performed on the vacuum electrode device using a prior art method if the pressure is low enough to avoid damaging the cathode within the device.

One exemplary embodiment of the invention is a pressure measurement device for determining the vacuum level within a housing of a vacuum electrode device, the pressure measurement device comprising an electrically conductive enclosure adapted to be positioned on an interior surface of the housing, an electrically conductive electrode adapted to extend through the housing, the electrode having a tip at one end adapted to be positioned within an interior of the housing inside the enclosure to define a gap between the tip and the enclosure and a conductive lead at a second end adapted to be disposed outside of the housing and a voltage source connected to the conductive lead to supply a voltage potential to the tip of the electrode.

Another exemplary embodiment of the invention is a method for determining the vacuum level within a housing of a vacuum electrode device, the method comprising the steps of providing a vacuum electrode device utilized to produce electrons including a housing defining an interior containing a vacuum therein and a pressure measurement device for determining the vacuum level within the housing, the pressure measurement device having an electrically conductive enclosure secured to an interior surface of the housing, an electrically conductive electrode extending through an aperture in the housing, the electrode having a tip at one end positioned within the interior of the housing inside the enclosure to define a gap between the tip and the enclosure and a conductive lead at a second end disposed outside of the housing and a voltage source connected to the conductive lead to supply a voltage potential to the tip of the electrode, biasing the electrode with a voltage from the voltage source to create a voltage difference between the tip and the enclosure, ionizing gas particles within the enclosure by causing the voltage difference to exceed the breakdown voltage of the gas particles and creating a current flow between the enclosure and the electrode as a result of a flow of ionized gas particles and electrons between the electrode and the enclosure.

Another exemplary embodiment of the invention is a vacuum electrode device utilized to produce electrons, the device comprising: a housing defining an interior containing a vacuum therein, a cathode disposed in the interior of the housing and operably connected to a first voltage source, the cathode configured to emit electrons upon application of voltage to the cathode, an anode disposed within the housing and spaced from the cathode, the anode maintained at an electric potential different than the cathode to attract electrons emitted from the cathode and a pressure measurement device for determining the vacuum level within the housing, the pressure measurement device comprising an electrically conductive enclosure secured to an interior surface of the housing, an electrically conductive electrode extending through an aperture in the housing, the electrode having a tip at one end positioned within the interior of the housing inside the enclosure to define a gap between the tip and the enclosure and a conductive lead at a second end disposed outside of the housing and a second voltage source connected to the conductive lead to supply a voltage potential to the tip of the electrode.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure

BRIEF DESCRIPTION OF THE DRAWINGS

The drawings illustrate the best mode presently contemplated of carrying out the disclosure. In the drawings.

DETAILED DESCRIPTION OF THE DRAWINGS

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 2:
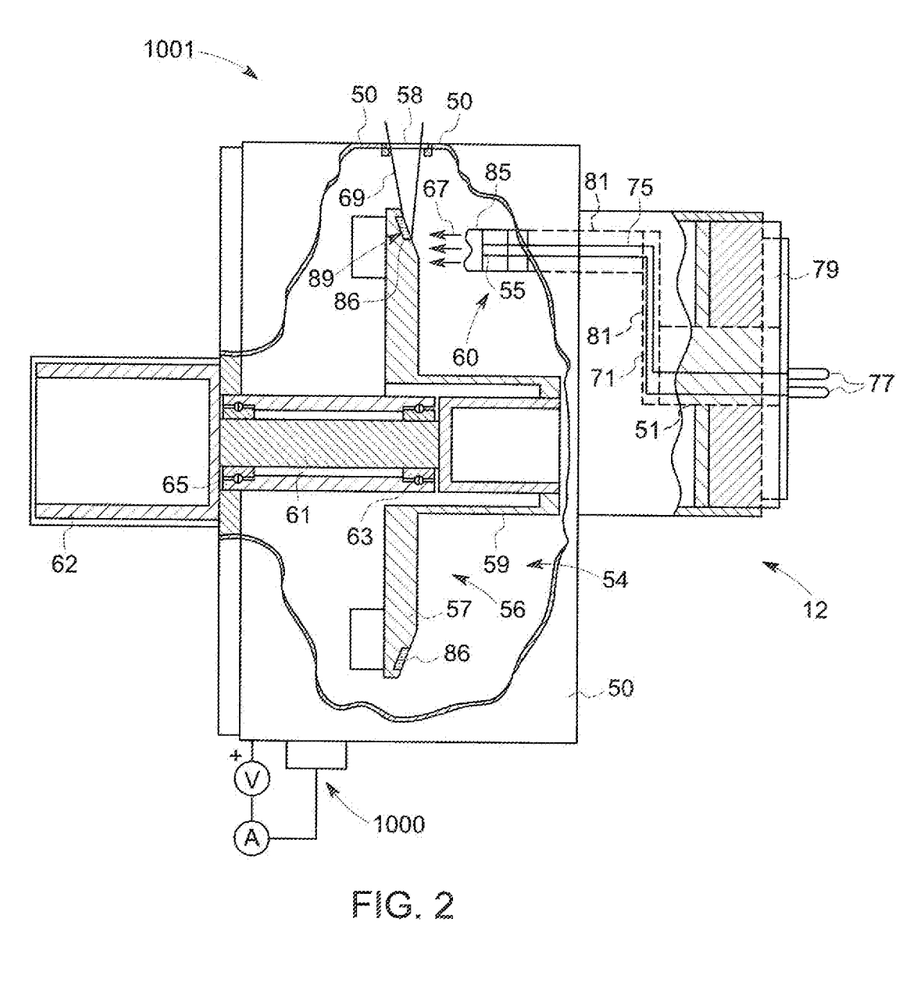
FIG. 2 is a cross-sectional view of an x-ray tube including a pressure measurement device according to an exemplary embodiment of the invention.

In the illustrated exemplary embodiment of FIG. 2, while the device can be any vacuum electrode device, such as electron beam source devices, power electronic devices, such as a klystron, or ignitron, among others, the vacuum electron device 1001 is an X-ray tube 12 incorporating embodiments of the invention. X-ray tube 12, such as can be utilized in the prior art imaging system 10, includes a frame 50 that encloses a vacuum region 54, and an anode 56 and a cathode assembly 60 are positioned therein. Anode 56 includes a target 57 having a target track 86, and a target hub 59 attached thereto. Terms "anode" and "target" are to be distinguished from one another, where target typically includes a location, such as a focal spot, wherein electrons impact a refractory metal with high energy in order to generate X-rays, and the term anode typically refers to an aspect of an electrical circuit which may cause acceleration of electrons theretoward. Target 56 is attached to a shaft 61 supported by a front bearing 63 and a rear bearing 65. Shaft 61 is attached to a rotor 62. Cathode assembly 60 includes a cathode cup 85 and a flat emitter or filament 55 formed of any suitable emissive material and coupled to a current supply lead 71 and a current return 75 that each pass through a center post 51. In operation, electrical current is carried to flat emitter 55 via the current supply lead 71 and from flat emitter 55 via the current return 75 which are electrically connected to source controller 30 and controlled by computer 22 of system 10 in FIG. 1.

Feedthroughs 77 pass through an insulator 79 and are electrically connected to electrical leads 71 and 75. X-ray tube 12 includes a window 58 typically made of a low atomic number metal, such as beryllium, to allow passage of x-rays therethrough with minimum attenuation. Cathode assembly 60 includes a support arm 81 that supports cathode cup 73, an emission source such as a coiled filament or a flat emitter 55, as well as other components thereof. Support arm 81 also provides a passage for leads 71 and 75.

In operation, target 56 is spun via a stator (not shown) external to rotor 62. An electric current is applied to flat emitter 55 via feedthroughs 77 to heat emitter 55 and emit electrons 67 therefrom. A high-voltage electric potential is applied between anode 56 and cathode 60, and the difference therebetween accelerates the emitted electrons 67 from cathode 60 to anode 56. Electrons 67 impinge target 57 at target track 86 and X-rays 69 emit therefrom at a focal spot 89 and pass through window 58.

Figure 3:
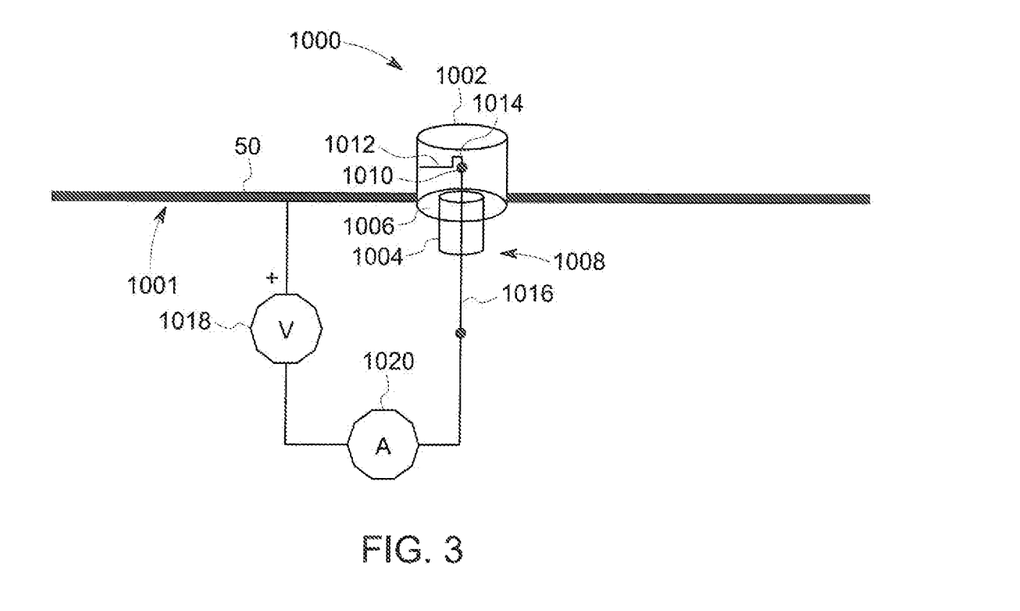
FIG. 3 is a partially broken away schematic view of a pressure measurement device for a vacuum electrode device according to an exemplary embodiment of the invention.
Figure 4:
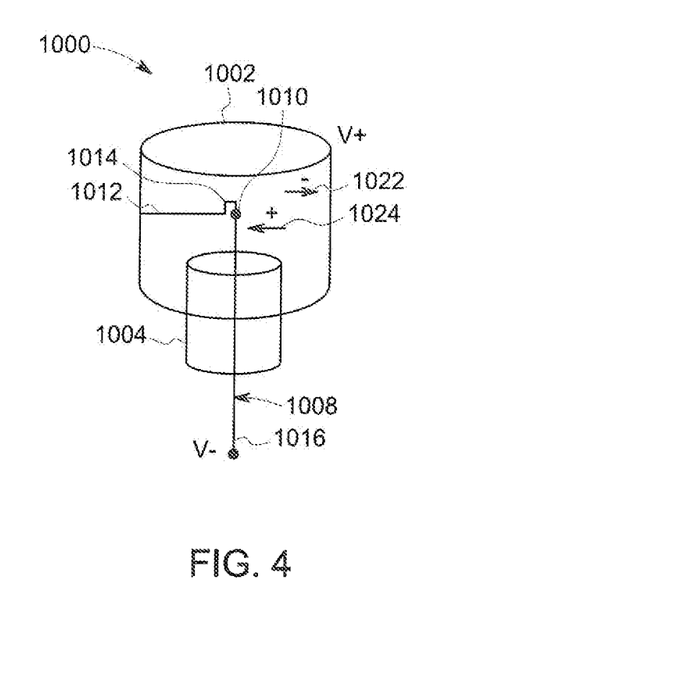
FIG. 4 is a schematic view of the pressure measurement device according to an exemplary embodiment of the invention used in the vacuum electrode device of FIG. 2.

Looking at the exemplary embodiments of the invention in FIGS. 2-4, the pressure measurement device 1000 is illustrated on the X-ray tube 12. The device 1000 is mounted directly to the housing 50 and includes an enclosure 1002 mounted to the housing 50, such as on the interior surface 1003 of the housing 50, that extends into the vacuum region or interior 54 of the housing 50. The enclosure 1002 is formed of an electrically conductive material, such as a metal, as this material not being an electron source can be made of vacuum grade steel, so that a voltage potential can be applied to the enclosure 1002 during operation of the device 1000. The enclosure 1002 can have any suitable shape, with the illustrated exemplary embodiment being cylindrical in shape with an open inner end 1005 and a diameter of between 10 mm-6 mm, though other diameters for the enclosure 1002 are also contemplated as being within the scope of the invention.

Centered relative to the enclosure 1002 is au electrically isolating feedthrough 1004. The feedthrough 1004 is formed of any suitable material and shape, with the illustrated exemplary embodiment being cylindrical in shape, and has a diameter less than that of the enclosure 1002. The feedthrough 1004 extends through an aperture 1006 in the housing 50 to enable an electrode 1008 to be positioned within the feedthrough 1004 and extend into the interior 54 of the housing 50.

The electrode 1008 is formed of an electrically conductive material such that a voltage potential can be applied to the electrode 1008 during operation of the device 1000. In exemplary embodiments of the invention, the material used for the construction of the electrode 1008 is a metal, such as a refractory metal including, but not limited to tungsten, molybdenum, nickel and alloys thereof, among others. The electrode 1008 includes a tip 1010 at one end. The tip 1010 is located within the housing 50 and is disposed approximately at the center of the enclosure 1002 below the open inner end 1005 of the enclosure 1002 with a uniform gap or space 1012 formed around the electrode 1008 between the electrode 1008 and the enclosure 1002. The radius 1014 of the tip 1010, which can be different or the same as the radius of the electrode 1008, can be from up to 2 mm-3 mm, but can also be up to 0.5 mm to enhance the electron field produced by the tip 1010, though other radius sizes for the tip 1010 are also considered to be within the scope of the invention.

Opposite the tip 1010, the other end of the electrode 1008 includes a high voltage conductive lead 1016 that is positioned on the exterior of the housing 50. The lead 1016 is operably connected to a voltage source 1018 capable of applying a voltage to the electrode 1008 in order to produce electrons at the tip 1010 of the electrode 1008. The lead 1016 is also operably connected to an ammeter 1020 that can measure any current passing through the lead 1016 from the tip 1010 of the electrode 1008.

In operation, after the device 1000 has been mounted to the housing of the source/tube 12, such as during the initial manufacture of the source/tube 12, a negative voltage potential V− is applied to the electrode 1008 and the tip 1010 from the voltage source 1018. This voltage contrasts with the voltage potential V+ at the enclosure 1002 to create a voltage difference between the tip 1010 and the enclosure 1002. As mentioned previously, this potential at the enclosure also be grounded, in which case, the gap 1012 only sees a voltage differential of V instead of 2V.

When the voltage difference between the enclosure 1002 and the tip 1010 exceeds the breakdown voltage of the gas particles 1024 present within the gap 1012, a spark forms which ionizes the gas particles 1024 and produces electrons 1022. The electrons 1022 move away from the tip 1010 towards the enclosure 1002 which has a positive voltage bias V+ relative to the negative voltage bias V− of the electrode 1008/tip 1010. The positively charged gas ions/ionized particles 1024 move towards the negatively biased tip 1010. This movement of the electrons 1022 and the ionized particles 1024 will enable an electric current or spark/arc to flow across the gap 1012 between the enclosure 1002 and tip 1010. This current can be measured by the ammeter 1020 and used to determine the vacuum level/gas pressure within the housing 50 for the source/tube 12.

The dimensions of the tip 1010 and the enclosure 1002 that define the size of the gap 1012 are dependent upon the magnitude of the voltage applied to the electrode 1008. If the voltage applied is smaller, e.g., under 1 kV, a smaller gap 1012 is required to enable the current or spark to reach between the tip 1010 and the enclosure 1002 with the levels of gas pressure to be measured. However, as the tolerances of the smaller components for provide the small gap 1012 render the construction of the device 1000 potentially more variable, in an exemplary embodiment of the invention a larger voltage, e.g., 1 kV to 5 kV, is applied to the electrode 1008 and tip 1010, allowing for a larger gap 1012 to be present between the tip 1010 and the enclosure 1002. This larger device 1000 increase the ease and consistency of the construction of the device 1000 which, in turn, allows for more consistency in the measurement of the gas pressure using the device 1000.

Furthermore, the geometry of the electrode 1008, and in particular the tip 1010, along with the material used to form the electrode 1008 and the size of the gap 1012 determines the pressure at which the device 1000 allows the spark to form and/or fire across the gap 1012. Thus, the size of the gap 1012, as well as the corresponding voltage bias applied to the device 1000, as well as the geometry of and material forming the electrode 1008/tip 1010 can be varied in the construction of the device 1000 in order to provide a device 1000 that fires at a desired pressure level. Thus, the device 1000 can be used alone, without an ammeter 1020, to provide a simple binary check for a good/no good indication of the gas pressure within the housing 50, or can be utilized with the ammeter 1020 to provide this check along with a measurement of the gas pressure within the housing 50.

With this device 1000, it is possible to assess the vacuum level/quality or gas pressure within the housing 50 and decide if it is safe for the main cathode 55 to be energized for better assessment of vacuum level. If the device 1000 reports a high pressure within the housing 50, the main cathode 50 would not be energized to avoid damage to the cathode/emitter 55. In particular, the device 1000 can be effectively utilized during a rework step in a manufacturing process for the sources 12 including the housings 50 where a source/tube 12 is pulled off-line for quality testing. Also, the device 1000 can be used for evaluation of a source/tube 12 being returned from the field or from active use for evaluation, as the device 1000 provides the ability to test the vacuum level of the source/tube 12 without use of the cathode 55. As a result, it is possible to avoid damage to the cathode 55 and hence increase the chances of harvesting more components of the source/tube 12, including the cathode 55, for reuse. In the illustrated exemplary configurations for the device 1000, the pressure range that can be determined using the device 1000 is from $1 \times 10^{-3}$ to $1 \times 10^{-5}$ Torr, optionally with emission enhancements to the electrode 1008/tip 1010.

Figure 5:
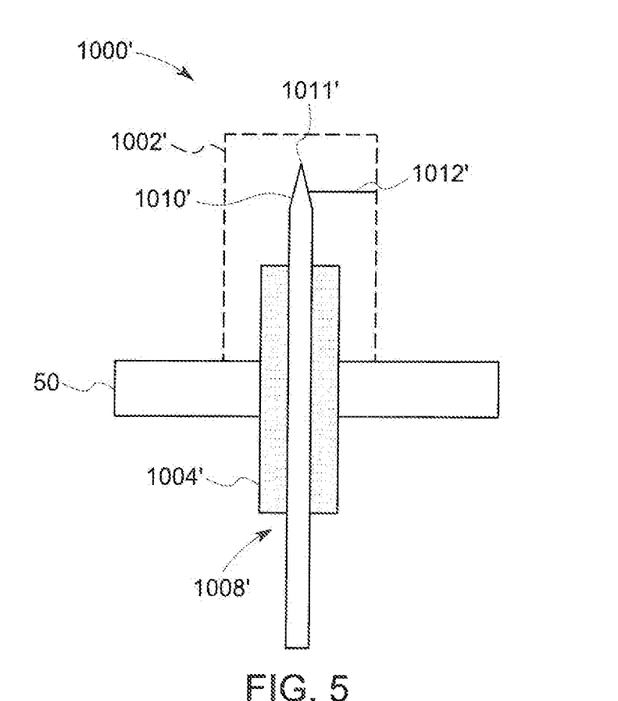
FIG. 5 is a schematic view of the pressure measurement device according to another exemplary embodiment of the invention used in the vacuum electrode device of FIG. 2.

In another exemplary embodiment of the invention illustrated in FIG. 5, the device 1000' includes an enclosure 1002' formed as a cylindrical mesh enclosure 1002' having a closed inner end 1005'. The feedthrough 1004' also extends outwardly from the aperture 1006' in the housing 50 on both sides of the aperture 1006', such that the feedthrough 1004' extends into the interior 54 of the housing 50 within the enclosure 1002'. Additionally, the tip 1010' of the electrode 1008' is formed with a sharp point 1011' to enhance the electron emission from the tip 1010'. Also, the housing 50 is shown as being formed of a metal casing, as opposed to the glass housings found in other types of sources 12, such as X-ray tubes. In this exemplary embodiment, the device 1000' is configured as a limited use device with a non-uniform electric field configuration created by intentional field enhancement as a result of the electrode geometry at the tip 1010'. In an exemplary embodiment of this device 1000', the device 1000' is formed with an inwardly tapered, sharp electrode tip 1010' with a field enhancement factor $\beta > 100$ and made of one or more refractory materials such as molybdenum, stainless steel, nickel or brass, among others. This device 1000' uses the field enhancement on the electrode tip 1010' to cause gas ionization when sufficient voltage is applied on the electrode 1008'. The operating voltage range here is high ~1 kV to 5 kV and the pressure detection range is low, i.e., on the order of $1 \times 10^{-3}$ Torr. If this gap 1012' is tested with a simple DC supply, the first breakdown voltage at which the spark is created is a primary measure for the pressure within the housing 50 as subsequent voltage breakdowns will shift due to damage/conditioning done to the electrode tip 1010'. Alternatively, a pulsed power supply (not shown) can be used to avoid damaging the electrode thereby providing prolonged usage life for this device 1000'.

Figure 6:
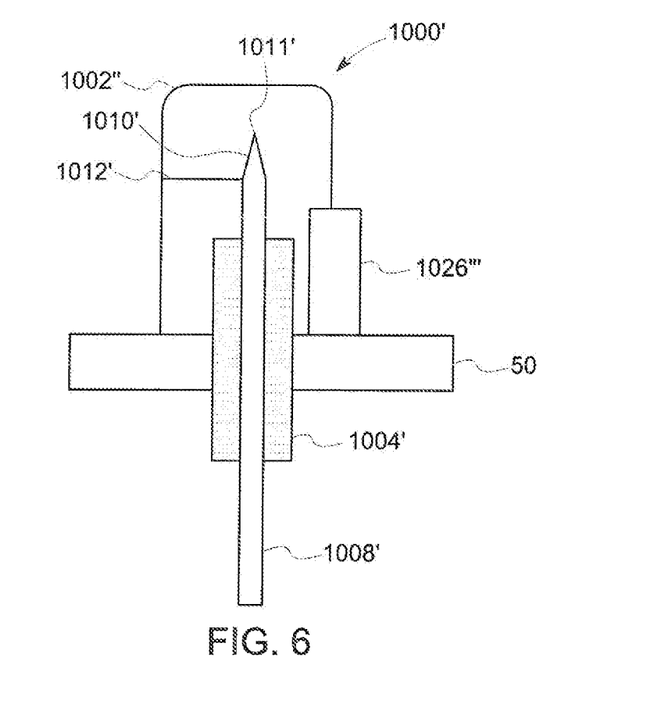
FIG. 6 is a schematic view of the pressure measurement device according to another exemplary embodiment of the invention used in the vacuum electrode device of FIG. 2.
Figure 7:
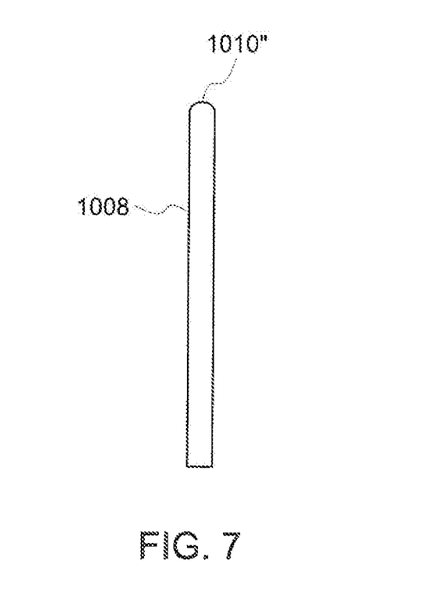
FIG. 7 is a side plan view of one exemplary embodiment of an electrode used in the pressure measurement device of FIG. 2.

In another exemplary embodiment of the invention shown in FIG. 6, the device 1000' is modified to include an enclosure 1002" formed as a solid shield electrode extending over the tip 1010' and electrode 1008'. This device 1000' works by applying a voltage differential across the electrode 1008' and the internal shield electrode/enclosure 1002". This can be done by:

a. keeping both of the electrode 1008' and shield electrode/enclosure 1002" isolated from the housing 50 and applying +Ve and −Ve voltages to the electrode 1008' and shield electrode/enclosure 1002", respectively, from two (2) voltage supplies 1018 with two (2) associated feedthroughs 1004';

b. leaving the shield electrode/enclosure 1002" and housing 50 at the same +Ve voltage and applying a −Ve voltage to the external electrode 1008'; or c. leaving the housing 50 and shield electrode/enclosure 1002" at ground potential and applying a −Ve voltage to the external electrode 1008'.

The shield electrode/enclosure 1002" is secured to the interior surface of the housing 50, such as by a suitable isolating mounting structure and a feedthrough (not shown) when it is desired to provide a voltage to the shield electrode/enclosure 1002" different from the electrode 1008'. Alternatively, the shield electrode/enclosure 1002" can be welded directly to the interior surface of the housing 50 when the when the shield electrode/enclosure 1002" is left at ground potential. The shield electrode/enclosure 1002" functions identically to the enclosure 1002 and the mesh electrode 1002', but additionally protects the electrode 1008' and tip 1010' from damage as a result of deposition or contamination from any other ion or electron sources present in the housing 50.

Figure 8:
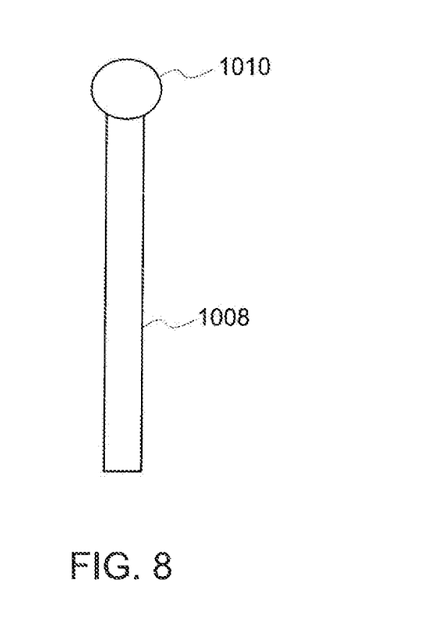
FIG. 8 is a side plan view of another exemplary embodiment of an electrode used in the pressure measurement device of FIG. 2.

In still other exemplary embodiments of the invention shown in FIGS. 3, 4, 7 and 8, the device 1000 is formed with an electrode 1008 having a tip 1010 with a rounded edge 1028 that provides a lower electrode field enhancement for a multiple use/reuse configuration for the device 1000. This embodiment of the device 1000 involves a fairly dull or rounded electrode tip 1010" rounded as in FIG. 7 or a bulbous tip 1010 as shown in FIGS. 3, 4 and 8, with an enhancement factor $\beta < 100$ which by itself cannot cause vacuum breakdown in 1 kV-5 kV range. This is overcome by adding an electron enhancement material to the surface of the tip 1010 or by using a doped material to form the tip 1010 and the electrode 1008. In exemplary embodiments of the invention, electrodes 1008 can be coated with $\alpha$ or $\beta$ emission source materials, such as americium or californium, among others or can be doped for longer life. The use of a coated surface electrode 1008 and/or tip 1010 can encounter the problem of erosion of the coating leading to limited life of the electrode 1008/tip 1010, but an exemplary embodiment of a 2% thoriated tungsten electrode 1008/tip 1010 would provide reliable operation for the device 1000.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pressure measurement device for determining the vacuum level within a housing of a vacuum electrode device comprising a cathode and an anode, the pressure measurement device comprising:
    an electrically conductive enclosure adapted to be positioned on an interior surface of the housing and spaced away from the cathode and the anode;
    an electrically conductive electrode extending through the housing through an electrically isolating feedthrough adapted to be secured to the housing, the electrode having a tip at one end positioned within an interior of the housing inside the enclosure to define a gap between the tip and the enclosure and a conductive lead at a second end disposed outside of the housing;
    a voltage source connected to the housing and the electrode via the conductive lead to supply a voltage potential between the housing and the tip of the electrode; and
    an ammeter operably connected between the enclosure and the electrode to measure current between the enclosure and the electrode.

2. The device of claim 1 wherein the electrically isolating feedthrough is positioned around the electrode between the tip and the conductive lead and adapted to be positioned within an aperture in the housing.

3. The device of claim 1, wherein the enclosure is cylindrical in shape.

4. The device of claim 3, wherein the enclosure is formed of a conductive mesh.

5. The device of claim 1, wherein the tip is tapered.

6. The device of claim 1, wherein the tip is rounded.

7. The device of claim 6, wherein the tip is bulbous in shape.

8. The device of claim 1, wherein the device is a spark gap device.

9. The device of claim 1, wherein the ammeter is connected to the conductive lead between the lead and the voltage source.

10. The vacuum electrode device of claim 1, wherein at least the tip of the electrode is coated with an electron enhancement material.

11. The vacuum electrode device of claim 1, wherein at least the tip of the electrode is comprised of 2% thoriated tungsten.

12. The vacuum electrode device of claim 1, wherein at least the tip of the electrode comprises a doped material.

13. The vacuum electrode device of claim 1, wherein a high voltage conductive lead is disposed at an end of the electrode opposite the tip, exterior to the housing, and connected to the voltage source.

14. The vacuum electrode device of claim 1 wherein the gap is uniform between the enclosure and the electrode around the entire electrode.

15. A vacuum electrode device utilized to produce electrons, the vacuum electrode device comprising:
    a housing defining an interior containing a vacuum therein;
    a cathode disposed in the interior of the housing and operably connected to a first voltage source, the cathode configured to emit electrons upon application of a current from the voltage source to the cathode;
    an anode disposed within the housing and spaced from the cathode, the anode maintained at an electric potential different than the cathode to attract electrons emitted from the cathode; and
    a pressure measurement device for determining the vacuum level within the housing, the pressure measurement device comprising:
        an electrically conductive enclosure secured to an interior surface of the housing and spaced away from the cathode and the anode;
        an electrically conductive electrode extending through an electrically isolating feedthrough disposed within an aperture in the housing, the electrode having a tip at one end positioned within the interior of the housing inside the enclosure to define a gap between the tip and the enclosure and a conductive lead at a second end disposed outside of the housing;
        a second voltage source connected to the housing and the electrode via the conductive lead to supply a voltage potential between the housing and the tip of the electrode; and
        an ammeter operably connected between the enclosure and the electrode to measure current between the enclosure and the electrode.

16. The vacuum electrode device of claim 15, wherein the vacuum electrode device is selected from the group consisting of: x-ray tubes, electron beam source devices, and power electronic devices, such as a klystron or ignitron.

17. The vacuum electrode device of claim 15, wherein the pressure measurement device is a spark gap device.

18. The vacuum electrode device of claim 15, wherein the ammeter is connected to the conductive lead between the lead and the second voltage source.

19. A method for determining the vacuum level within a housing of a vacuum electrode device comprising a cathode and an anode, the method comprising the steps of:
    providing vacuum electrode device utilized to produce electrons including a housing defining an interior containing a vacuum therein and a pressure measurement device for determining the vacuum level within the housing, the pressure measurement device comprising:
        an electrically conductive enclosure secured to an interior surface of the housing and spaced away from the cathode and the anode,
        an electrically conductive electrode extending through an aperture in the housing, the electrode having a tip at one end positioned within the interior of the housing inside the enclosure to define a gap between the tip and the enclosure; and
        a conductive lead at a second end disposed outside of the housing and a voltage source connected to the housing and the electrode via the conductive lead to supply a voltage potential between the housing and the tip of the electrode;
    biasing the electrode with a voltage from the voltage source to create a voltage difference between the tip and the enclosure;
    ionizing gas particles within the enclosure by causing the voltage difference to exceed the breakdown voltage of the gas particles; and
    creating a current flow between the enclosure and the electrode as a result of a flow of ionized gas particles and electrons between the electrode and the enclosure.

20. The method of claim 19 further comprising the step of measuring the current flow to determine the vacuum level in the housing.

21. The method of claim 19, wherein the tip is rounded and further comprising the step of repeating the method after creating the current flow to perform additional vacuum level determinations for the vacuum electrode device.

\* \* \* \* \*